United States Patent [19]

McWhinnie

[11] Patent Number: 5,089,121
[45] Date of Patent: Feb. 18, 1992

[54] APPARATUS FOR RECOVERING RESIDUAL TAR OR OIL FROM A FLUID MEDIUM

[75] Inventor: Robert McWhinnie, Stonehaven, Scotland

[73] Assignee: Alba International Limited, Aberdeen, Scotland

[21] Appl. No.: 389,483

[22] Filed: Aug. 4, 1989

[30] Foreign Application Priority Data

Aug. 5, 1988 [GB] United Kingdom ........... 8818616

[51] Int. Cl.$^5$ .............................. E02B 15/04
[52] U.S. Cl. ............................. 210/175; 210/242.3; 210/396; 210/400; 210/923; 210/774
[58] Field of Search ............... 210/774, 776, 783, 791, 210/175, 187, 242.3, 242.4, 396, 400, 923, 924, 925; 208/390, 391

[56] References Cited

U.S. PATENT DOCUMENTS

| | | | |
|---|---|---|---|
| 3,617,555 | 11/1970 | Ginsburgh et al. | 210/242.4 |
| 3,890,234 | 6/1975 | Galicia | 210/242.3 |
| 3,947,360 | 3/1976 | Fast | 210/242.3 |
| 4,061,569 | 12/1977 | Bennett et al. | 210/776 |
| 4,138,340 | 2/1979 | Suzuki et al. | 210/396 |
| 4,336,137 | 6/1982 | Byers | 210/242.3 |
| 4,456,536 | 6/1984 | Lorenz et al. | 210/776 |

FOREIGN PATENT DOCUMENTS

| | | |
|---|---|---|
| 943871 | 3/1974 | Canada . |
| 1101342 | 5/1981 | Canada . |
| 1136556 | 11/1982 | Canada . |
| 1230561 | 12/1987 | Canada . |
| 0128729 | 12/1984 | European Pat. Off. . |
| 2341177A1 | 8/1973 | Fed. Rep. of Germany . |
| 2248715 | 5/1975 | France . |
| 2357688 | 3/1978 | France . |
| 79/01135 | 12/1979 | PCT Int'l Appl. . |
| WO88/08388 | 11/1988 | PCT Int'l Appl. . |
| 1183067 | 3/1970 | United Kingdom . |
| 1442874 | 8/1973 | United Kingdom . |
| 1435343 | 5/1976 | United Kingdom . |
| 1553461 | 9/1979 | United Kingdom . |
| 2020563 | 10/1979 | United Kingdom . |

Primary Examiner—Robert A. Dawson
Assistant Examiner—David Reifsnyder
Attorney, Agent, or Firm—Lowe, Price, LeBlanc & Becker

[57] ABSTRACT

There is disclosed a method and apparatus for recovering sticky tar or oil from a fluid medium, such as water or sand. The tar is first separated from the fluid medium, e.g. by an open mesh conveyor, and the separated tar is subjected to intense heating, e.g. from live flame tubes or heat exchangers using very high temperature circulating medium. This heating liquefies the tar rapidly, and the liquid tar is directed into a suitable collection tank, which may itself be provided with a heater to maintain the tar in its liquid state.

13 Claims, 2 Drawing Sheets

APPARATUS FOR RECOVERING RESIDUAL TAR OR OIL FROM A FLUID MEDIUM

BACKGROUND OF THE INVENTION

1. Field of the Invention

This present invention relates to a method and apparatus for recovering residual tar or oil from a fluid medium. It is particularly, though not exclusively, concerned with the recovery of the residual material comprising the heavier components of crude oil from oil spillages in the sea.

When crude oil is accidentally spilled into the sea, for example by leakage from off-shore oil platforms or from oil tankers, the lighter, more volatile constituents of the crude oil evaporate, leaving the heavier constituents floating on the water surface as a thick sticky mixture presenting a severe problem of pollution. As the frequency and scale of such accidental spillages increases, ever increasing attention is being directed to tackling the problems of pollution of the sea and beaches.

The rate at which the lighter constituents evaporate depend upon the water and air temperature, and in geographical areas, such as the Arabian Gulf, where these temperatures are relatively high, the spilled oil relatively quickly takes the form of a sticky mat comprising the heavier oil constituents; this mat is, effectively, tar. Depending upon the size of the spillage and the sea conditions, the mat may break up into relatively small pieces, known as tar balls.

2. Description of the Prior Art

Existing techniques for recovery of the tar have not been entirely successful. One major problem area is in the handling of the tar once it has been removed, by whatever means, from the sea. It is known, for example, to use skimmers of oleophilic material to which the spilled oil clings, the oil subsequently being squeezed or scraped from the skimmers. The devices for removing the oil from the skimmers tend to become clogged, and therefore require constant attention.

SUMMARY OF THE INVENTION

According to a first aspect of the invention, the property of tar whereby it can be liquefied by the application of extreme heat, is employed to advantage.

According to this first aspect of the invention, there is provided apparatus for recovering tar or heavy oil from a fluid medium, the apparatus comprising means for substantially separating the tar or oil from said medium, conveyor means for conveying the separated tar or oil, heating means for applying intense heat to the conveyed tar or oil for liquefying it, and means for receiving the liquefied tar or oil from said heating means.

According to this first aspect of the invention, there is also provided a method for recovering tar or heavy oil from a fluid medium, the method comprising substantially separating the tar or oil from said medium, conveying the separated tar or oil to a heating means where the tar or oil is subjected to intense heating whereby it is quickly liquefied, and collecting the liquefied tar or oil.

In the described embodiment, the heating means presents a heated solid surface which is heated by a flame heat source and with which the conveyed tar or oil comes into contact.

The conveyor means may comprise an endless belt conveyor arranged to project downwardly into the medium and to lift the tar or oil adhering to it out of the medium, and to convey it to said heating means. The conveyor belt, which is preferably of an open mesh construction, may be provided with a multiplicity of projections, for example transverse rows of spikes regularly spaced along the belt, these spikes serving to impale the tar balls or pieces of the tar mat and then lift them out of the medium.

The tar may be scraped from the conveyor by a scraper which, in the above-mentioned arrangement, using rows of spikes, may comprise a fixed row of spikes extending in a direction across the belt at a position where the belt travels downwardly, the fixed spikes being arranged to interdigitate with the rows of spikes on the conveyor belt to produce a combing action. The scraper is preferably fixed to the heated solid surface so that the tar or oil scraped from the conveyor immediately passes onto the heated surface, where it is liquefied.

The heated solid surface may be an upper surface portion of a heating tube extending in a direction across the belt, the fixed spikes being integral with this heating tube. The tube is preferably internally flame-heated.

A chute may be provided for directing the molten tar which falls off the flame tube into a suitable collection vessel. This vessel may itself include a further heating means for heating the tar liquid. If the apparatus is to be used for recovering oil/tar from off-shore spillages, the apparatus would be mounted on a suitable vessel which can be propelled into the spillage so as progressively to remove the tar balls or mat from the water surface.

According to a second aspect of the invention, there is provided apparatus for recovering tar or heavy oil from a fluid medium, the apparatus comprising a belt conveyor in which a driven belt forms an endless elongate loop, mounting means for mounting the conveyor so as to project downwardly into the tar-bearing fluid medium, the belt including a multiplicity of projections to facilitate adhesion of the tar or oil to the belt, and means for scraping from the belt tar or oil lifted by the belt from the medium, said scraping means being disposed adjacent the belt at a position where it will travel downwardly, and having portions adapted to project into spaces between said projections of the belt.

An embodiment of the invention will now be described, by way of example, with reference to the accompanying drawings.

DESCRIPTION OF THE PREFERRED EMBODIMENT

Figure 1:
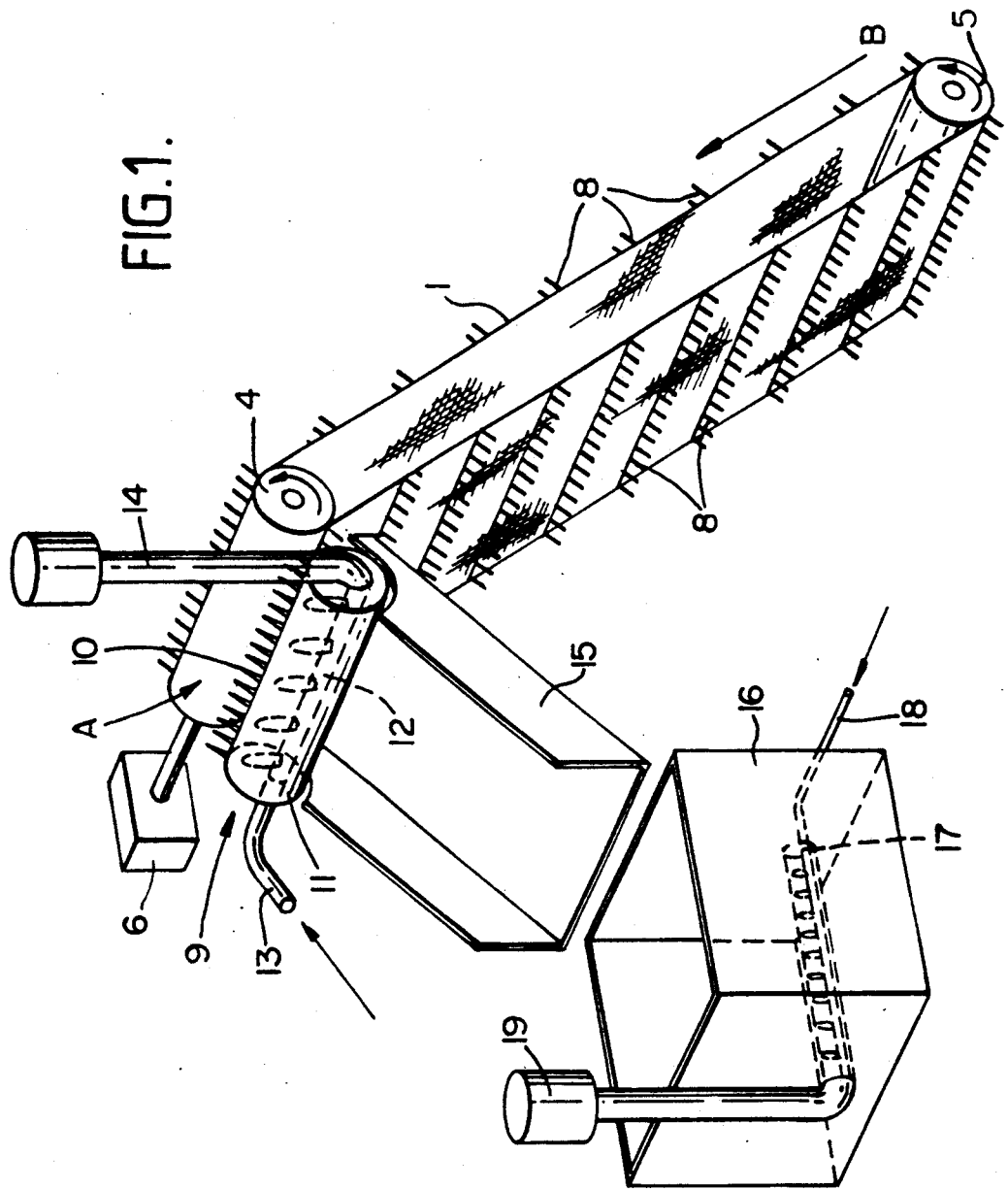
FIG. 1 is a schematic isometric view of an apparatus according to the present invention.

It should be noted that the following description relates to an arrangement which has been tested on an experimental basis; its adaptation to a large-scale machine may involve modifications in shape and form of several of its constituent components. It is envisaged, however, that the principle of operation, as defined earlier in relation to the different aspects of this invention, will remain substantially unchanged.

In the illustrated arrangement, a continuous belt 1 is mounted on a suitable support structure (the elements of which are omitted from the figures for the sake of clarity) so that it projects, or may be made to project in a downwardly inclined direction. The apparatus may, for example, be mounted at the bows of a suitable monohull or catamaran barge 2; with such an arrangement, the lower forward end 3 of the belt will lie beneath the water surface.

The support structure mounts an upper roller 4 and a lower roller 5 round which the belt 1 passes. The upper roller is driven by a rotary power source, for example a hydraulic motor 6, the direction of rotation of the drive roller 4 being such that the upper run 7 of the belt moves upwardly in the direction B.

The belt is preferably of an open steel mesh construction to present least resistance to the forward motion F of the barge through the water.

Fixed to the belt 1 are a number of regularly spaced, transverse rows of sturdy steel spikes 8 which project substantially perpendicularly from the outer surface of the belt. As the barge is driven into an area where tar mat M or tar balls B lie on the water surface, the tar is impaled by the spikes 8 and is lifted clear of the water and conveyed towards the upper roller 4.

Figure 2:
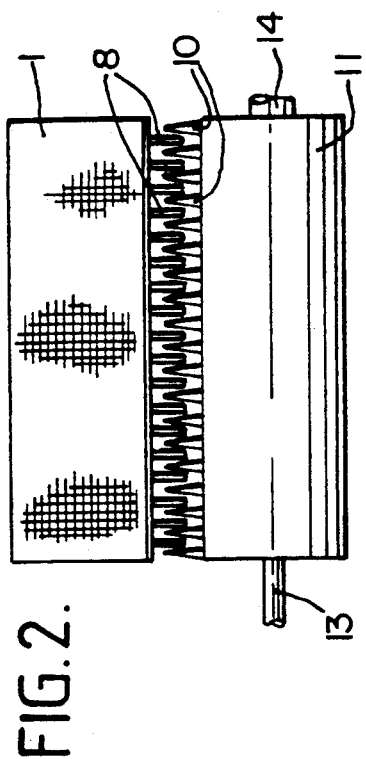
FIG. 2 is a view, as seen in the direction of the arrow A in FIG. 1, of part of the apparatus of FIG. 1.

Immediately behind the upper roller 4 and also mounted on the support structure, is a tar removal and liquefying device 9 which removes the tar from the belt at a position where the belt is moving downwardly, and causes the removed tar to be applied to an extremely hot solid surface where it is substantially instantly liquefied. The tar is removed by a transverse row of sturdy steel tines 10 which provide a combing action to remove the tar from the rows of steel spikes 8, the fixed tines 10 interdigitating with the moving spikes 8 as can best be seen in FIG. 2. This row of tines 10 also performs a partial scraping action in the portions of the belt between the rows of spikes 8.

The tines 10 project radially from and are integrally fixed to the ;;all of a tough steel heater tube 11 extending across and alongside the belt. This tube is internally flame heated, a suitable form of burner 12 being disposed within the tube and supplied with gas from a gas supply line 13. With this arrangement, the upper surface of the tube 11, and also the tines 10 are heated to an extremely high temperature which facilitates efficient removal of the tar from the belt and instantaneous liquefying thereof. A flue 14 projects upwardly from the upper end of the tube 11 and conducts combustion gases from within the tube well away from the operating area of the device.

A chute 15, also mounted on the support structure, projects downwardly to guide the flow of molten tar into a collection tank 16, the upper end of the chute 15 being disposed immediately beneath the flame tube 11. The molten tar flows rearwardly over the upper surface of the tube 11 and drops into this chute 15.

The tank 16 may be provided internally with a further flame tube 17 connected to a gas supply 18 and exhaust fume flue 19, this arrangement serving to maintain the collected tar in a liquid state. This tar can then be pumped into barrels which can be removed from the barge at a suitable shore base. Alternatively, the liquefied tar may be directed by the chute 15 into a skip-like tank to be removed at the shore base from the barge, and there fitted with a suitable burner to re-liquefy the collected tar.

The tar collected in the tank 16 in the above-described apparatus is of very low water content.

Most of the water will have drained from the tar through the open mesh belt during its upward travel along the upper belt run 7. Further remaining water is immediately turned into steam by the very high temperature of the flame tube 11. The recovered tar is in a form which with little or no further processing lends itself to further use, for example road mending or making. Naturally, the tar may be refined for other uses.

Shrouding 20 may be provided over the tar removing and liquefying device 9, and in particular over the area of the tines 10 to protect operators of the device from the steam and spitting which inevitably occurs in this region.

Despite the use of extreme heat to liquefy the tar, this does not constitute a fire hazard, since the heavier oil constituents which make up the tar are in fact very difficult to ignite.

Although the invention is particularly described above in terms of an apparatus for off-shore use, the principles which the apparatus embodies may equally be applied to a beach cleaning machine for picking up tar balls and tar deposits on sandy or shingle beaches, the sand or shingle constituting in effect a fluid medium which will flow through the open mesh belt as the impaled tar balls are lifted.

Figure 3:
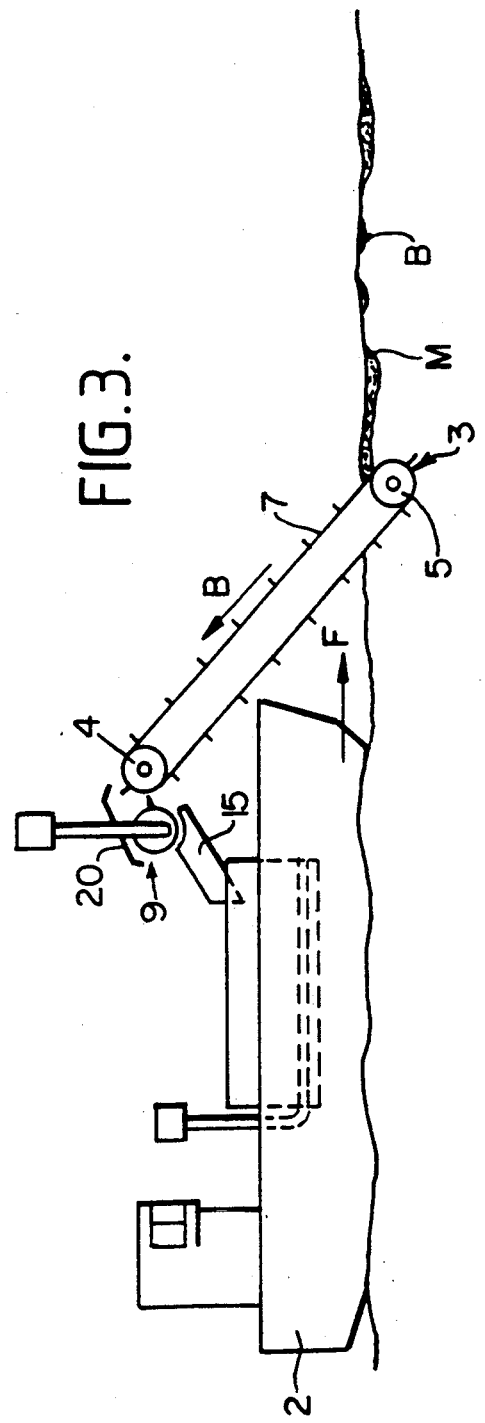
FIG. 3 is a schematic view of a tar recovery apparatus mounted on a vessel for off-shore oil recovery.

Also, the machine may be adapted for the removal of tar balls from sea water, for example at the sea water intakes of desalination and power generating plants. In this application, the intake water is passed through a moving screen filter which may or may not be fitted with spikes corresponding to the spikes 8 in the apparatus of FIGS. 1 to 3. Heat to remove the tar from the moving screen conveyor may be applied by flame tubes or some similar device using oil or gas burners above or below the moving conveyor. The molten tar would then drop through the screen into a suitable chute or directly into a collection tank.

In each of the above embodiments, the heat used to liquefy the tar may be provided by recirculating very hot oil or some alternative liquid through pipework arranged to form an effective heat exchanger. In each case, very high temperatures well above the temperature of steam, is used to advantage to effect rapid liquefying of the tar.

I claim:

1. Apparatus for recovering tar or heavy oil from a fluid medium, the apparatus comprising means for substantially separating the tar or oil from said medium, conveyor means for conveying the separated tar or oil, scraper means for removing the tar or oil from the conveyor means, heating means arranged to present a heated solid surface with which the conveyed tar or oil comes into contact for applying intense heat to the tar or oil at the position of its removal from the conveyor means by said removing means for liquefying said tar or oil, wherein said scraper means is fixed to the heated solid surface so that the tar or oil scraped from the conveying means immediately passes onto the heated surface, where it is liquified, and means for receiving the liquified tar or oil from said heating means.

2. Apparatus according to claim 1 wherein the solid surface is heated by a flame heat source.

3. Apparatus according to claim 1, wherein the conveying means comprises a endless belt conveyor arranged to project downwardly into the medium and to lift the tar or oil adhering to it out of the medium, and to convey it to said heating means.

4. Apparatus according to claim 3, wherein the conveyor belt is of an open mesh construction.

5. Apparatus according to claim 3 wherein said conveyor belt is provided with a multiplicity of projections for facilitating adhesion of the tar or oil to the belt.

6. Apparatus according to claim 5 wherein said projections comprise a plurality of transverse rows of spikes spaced along the belt.

7. Apparatus according to claim 3 wherein said conveyor belt being provided with a plurality of transverse rows of spikes spaced along the belt for facilitating adhesion of the tar or oil to the belt, and wherein said scraper comprises at least one fixed row of spikes, the row extending in a direction across the belt at a position where the belt travels downwardly, the fixed spikes being arranged to interdigitate with the rows of spikes on the conveyor belt to produce a combing action.

8. Apparatus according to claim 7, wherein the heated solid surface is an upper surface portion of a heating tube extending in a direction across the direction of conveying of the tar or oil, the fixed spikes being integral with this heating tube.

9. Apparatus according to claim 8 wherein the tube is internally flame-heated.

10. Apparatus according to claim 1 wherein the receiving means comprises a chute for directing the liquefied tar from the heating means into a suitable collection vessel.

11. Apparatus according to claim 10 wherein there is provided a further heating means for heating the oil or tar in said collection vessel to keep it liquid.

12. Apparatus for recovering tar or heavy oil from a fluid medium, the apparatus comprising a belt conveyor in which a driven belt forms an endless elongate loop, mounting means for mounting the conveyor so as to project downwardly into the tar or oil-bearing fluid medium, the belt including a multiplicity of projections to facilitate adhesion of the tar or oil to the belt, and means for scraping from the belt tar or oil lifted by the belt from the medium, said scraping means being disposed adjacent the belt at a position where it will travel downwardly, and having portions adapted to project into spaces between said projections of the belt, means being provided for heating the scraping means and for heating the tar or oil scraped from the belt so as to liquefy it.

13. Apparatus for recovering tar or heavy oil from a fluid medium, the apparatus comprising means for substantially separating the tar or oil from said medium, conveyor means for conveying the separated tar or oil, means for removing the tar or oil from the conveyor means, heating means arranged to present a solid surface heated by a flame heat source, with which the conveyed tar or oil comes into contact, for applying intense heat to the tar or oil at the position of its removal from the conveyor means by said removing means for liquefying said tar or oil, and means for receiving the liquified tar or oil from said heating means.

* * * * *